United States Patent [19]

de Putter

[11] 4,119,122
[45] Oct. 10, 1978

[54] PIPE WITH AN OUTER FOAM PLASTIC COVERING

[75] Inventor: Warner Jan de Putter, Hardenberg, Netherlands

[73] Assignee: Wavin B.V., Netherlands

[21] Appl. No.: 696,629

[22] Filed: Jun. 16, 1976

[30] Foreign Application Priority Data

Jun. 19, 1975 [NL] Netherlands .......................... 7507351

[51] Int. Cl.² ............................................. F16L 57/00
[52] U.S. Cl. .................................. 138/103; 138/129; 138/133; 138/149; 138/150; 138/144; 138/172; 138/173; 138/174
[58] Field of Search ............... 138/103, 149, 172, 173, 138/174, 144, 150, 154, 122, 121, 133, 129, 132; 174/101.5; 9/8 R

[56] References Cited

U.S. PATENT DOCUMENTS

| 2,353,494 | 7/1944 | Patten et al. ...................... 138/129 X |
| 2,531,958 | 11/1950 | Williams et al. ................. 138/103 X |
| 2,731,070 | 1/1956 | Meessner .......................... 138/132 X |
| 3,024,153 | 3/1962 | Kennedy .......................... 138/144 X |
| 3,554,237 | 1/1971 | Pelley et al. ...................... 138/149 X |
| 3,737,353 | 6/1973 | Gilbu ............................... 138/121 X |
| 3,818,950 | 6/1974 | Pearson ............................... 138/174 |
| 3,916,953 | 11/1975 | Nagayoshi et al. .................. 138/129 |
| 3,925,132 | 12/1975 | Bartlow et al. .................. 138/172 X |

Primary Examiner—Harry N. Haroian
Assistant Examiner—James E. Bryant, III
Attorney, Agent, or Firm—Ostrolenk, Faber, Gerb & Soffen

[57] ABSTRACT

A pipe having an outer coating of foam plastics, a tape of thermoplastics being wrapped around the foam plastics in an overlapping way, the overlapping parts being heatsealed to each other. At least one reinforcing filament is present on the original contacting surfaces of the overlaps. Preferably one straight and one zig-zag applied filament are present.

19 Claims, 7 Drawing Figures

U.S. Patent  Oct. 10, 1978  Sheet 3 of 3  4,119,122
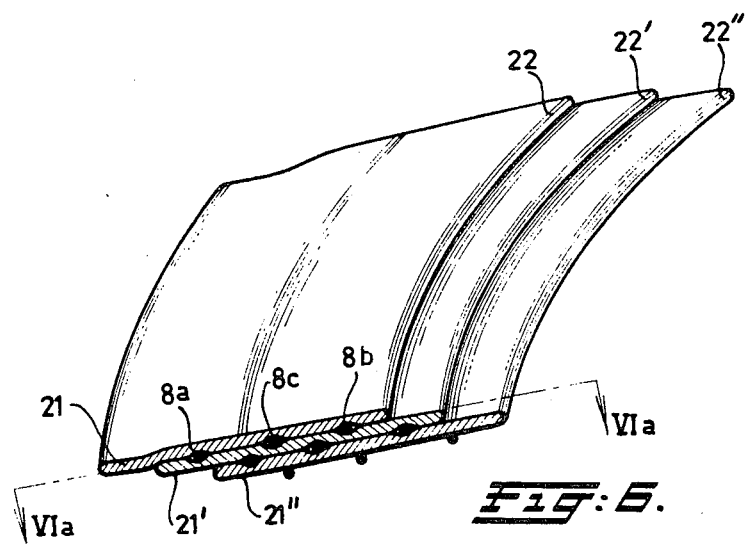
Fig:6.
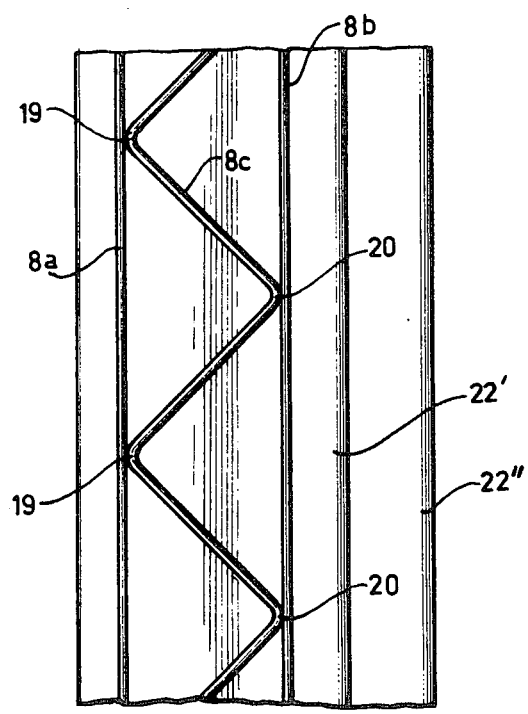
Fig:6a.

PIPE WITH AN OUTER FOAM PLASTIC COVERING

BACKGROUND OF THE INVENTION

My invention relates to a pipe at least on a part of its length provided with an outer foam plastic layer which on its outside is wrapped with a surface layer consisting of windings of thermoplastic tape partially overlapping each other, the overlapping parts being sealed to each other.

Such a known pipe having over a part of the length an outer polyurethan foam plastic layer which on its turn is wrapped on its outside with a polyethylene covering layer is obtained by wrapping the polyurethan layer at the temperature of extrusion with polyethylene tape issuing from the extruder, the overlapping parts of the tape being automatically heatsealed to each other.

Also pipes are known in which a thermoplastic tape which at normal temperature is wrapped around the foam plastic layer, whereupon the overlapping parts are heatsealed to each other by means of a heatsealing tool.

These pipes are advantageous in that due to the presence of the foam plastic layer a great floating power can be imparted thereto whereby such pipes may be used as floating pipes in dredging operations. In that case preferably an inner pipe is used consisting of fibre reinforced plastic, like glass fibre reinforced polyester- or epoxy pipe. Obviously it is also possible to use metal pipes to which a floating power is imparted by means of the foam plastic layer.

On the other hand the foam plastic layer can serve as insulating material for a pipe, particularly a metal pipe, which is particularly of importance in conveying warm fluids, like heated hydrocarbon products or cooled hydrocarbon products, e.g. liquefied natural gas products, through such a pipe. Although these pipes in practice are satisfactory and can be economically manufactured, since it is sure that a reliable sealed joint is formed by using a polyethylene tape issuing from an extruder, such pipes have the drawback that in case of damages, as e.g. owing to collisions of such pipes as used as floating pipes in dredging operations with boats, or, in installing the pipes in the ground, owing to sharp objects, like sharp stones, this damage causes a lengthwise extending crack, whereby the whole wrapping of the pipe loosens and gets lost, so that the foam plastic becomes uncovered.

In floating pipe bodies as used in dredging now the waves cause a fast corrosion of the foam plastic layer, whereby after a short time the buoyancy of the pipe is lost and a new pipe should be provided.

In the case of pipes installed in the ground the problem occurs that water can penetrate into the foam plastic layer, when the covering layer is damaged involving a decrease of the insulating power considerably.

SUMMARY OF THE INVENTION

My invention aims to obviate these difficulties and to provide a pipe of the aforementioned type which has not this drawback and in which in case of damage caused e.g. by boats to floating pipe parts, or by sharp objects, as in case of pipe lines installed in the ground, the damage does not give rise to a crack extending on the length of the covering layer.

This object is attained according to the invention in that at least one, either straight or wavy or zig-zag reinforcing member is embedded in the overlapping area of the thermoplastic tape material. Advantageously the reinforcing member consists at least of one threadlike reinforcing member situated in the plane forming the contact plane between the overlapping parts and wound around, the overlap, preferably a glass filament. The filamentous reinforcing member consists preferably of a substantially inductile reinforcing member, the term inductile should be considered in connection with thermoplastic covering layer, that is to say e.g. polyethylene.

A particularly recommendable pipe which can be manufactured at a low cost is a pipe in which the thermoplastic tape material when applied to the pipe has a temperature at which the overlapping parts are fused together.

Preferably the covering layer extends for a certain length on either side of the foam plastic layer onto the surface of the pipe, e.g. for 2 to 20 cm, whereby the covering layer adheres well to the pipe.

With a pipe used as floating pipe part the covering layer consists preferably of an end covering layer part extending on the foam plastic body and a central covering layer part which, not sealed together, cooperates with the outer side of the two end covering layers. Such a construction appears particularly satisfactory in case of floating pipe parts which in general are exposed to low temperatures at sea.

In a very efficient embodiment of such a pipe a slide layer is disposed between the outside of the end covering layers and the inside cooperating therewith of the central covering layer part, while preferably the slide layer extends from the outside of one of the end covering layers as far as the outside of the covering layer. The slide layer consists preferably of a fibre layer, preferably a layer of parchment paper fibres.

The invention comprises likewise a method for manufacturing such a pipe which at least for a part of its length is provided with an external foam plastic layer wrapped on its outside with thermoplastic tape material and sealing the overlapping parts to each other in order to obtain a covering layer, wherein at least one reinforcing member is disposed between the overlapping parts of the thermoplastic tape material prior to sealing them together.

Preferably the wrapping is effected with thermoplastic tape material, issuing from an extruder, at the temperature of extrusion, whereby an immediate sealing together of the overlapping parts is effected.

The thermoplastic tape material is e.g. a polyvinylchloride tape material, but particularly polyethylene tape material is preferred.

It is not quite clear why the presence of a reinforcing member counteracts the development of cracks extending in a longitudinal or cross direction, since polyethylene material has rather good elastic properties, Presumably, however, strains are produced on heat sealing the overlapping parts together, the strains giving rise to the development of cracks extending in the longitudinal or cross direction of the covering layer, so that the pipe after a shorter or longer time becomes unfit for use.

According to a particular embodiment and in a very efficient manner at first the two short sides of the foam plastic layer are wrapped with thermoplastic tape as far as a part on the outside of the foam plastic body, whereupon at a second stage the part of the foam plastic layer located between the two ends is wrapped with thermoplastic tape material.

SURVEY OF THE DRAWINGS

FIG. 1 shows diagrammatically a section through a pipe according to the invention, FIG. 2 shows another embodiment according to the invention, FIG. 3 yet another embodiment, FIG. 4 shows a device for performing the method according to the invention, FIG. 5 is a section to a larger scale of a pipe according to the invention, and FIG. 6 and 6a is a part of a covering layer with three overlapping windings.

DESCRIPTION OF A PREFERRED EMBODIMENT

Figure 1:
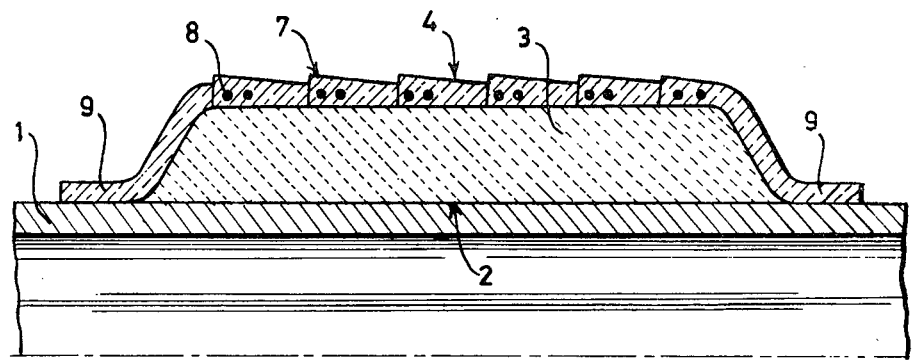

FIG. 1 shows a first embodiment of a pipe according to the invention, consisting of a polyester glass fibre pipe 1 which on its outside 2 is provided with a cylindrical polyurethan foam plastic layer 3 observing to impart buoyancy or insulation to such a pipe. The polyurethan foam layer is obtained by spraying a foamable composition onto the rotating tube.

In order to obtain a proper sealing with respect to the outside, the cylindric foam plastic layer 3 is provided with a covering layer 4 consisting of polyethylene tape 5 which is helically wound around the cylindrical foam plastic layer, the overlapping parts 6 of the polyethylene tape being heatsealed to each other. The overlap amounts preferably to at least 50% and more preferably to 70 to 80% of the width of the tape. Due to the fact that the cylindrical foam plastic layer is wrapped with a polyethylene tape issuing from an extruder and having a homogeneous temperature varying from 150° to 180° C. the overlapping parts 6, 6' will immediately fuse when they contact each other and accordingly an excellent sealing covering layer is obtained.

In order to obtain a good quality of pipe, there is embedded in the contact plane 7 formed by the two overlapping parts of the tape, a reinforcing member 8 consisting of a glass filament preferably two. It is obvious, however, that one is not limited to the use of glass filaments, as also carbon filaments or other such-like materials can be used. Particularly advisable is the use of filaments which have only a minor elasticity while the minor elasticity should be related to tape material. Also polyester filaments may be used.

The covering layer 4 extends on the short sides of the cylindric plastic layer 3 for a particular length by a part 9 over the free outer surface 2 of the pipe 1.

Although in the foregoing there is question of a glass fibre reinforced polyester pipe 1, this pipe can obviously also consist of metal.

Figure 2:
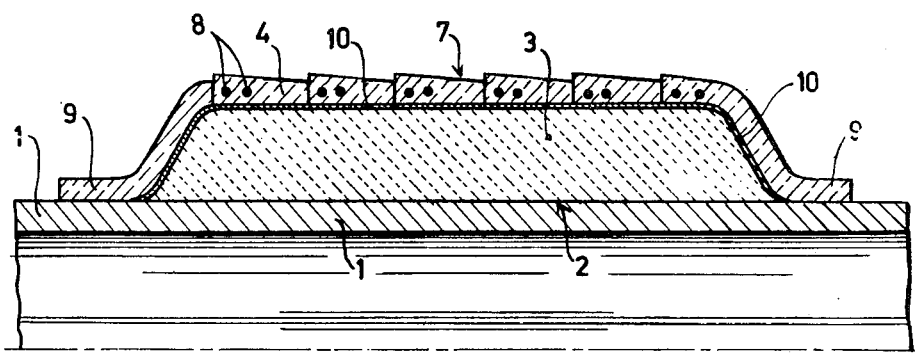

In FIG. 2 is also represented another embodiment, likewise consisting of a glass fibre reinforced polyester pipe, on which is disposed a cylindrical foam plastic body 3, and with a covering obtained by wrapping with polyethylene tape, issuing from an extruder, in a helically overlapping manner. A reinforcing glass filament 8 is provided in the contact plane 7 between the two surfaces of the overlapping layers 5.

It is obvious that one is not limited thereto and that also carbon filaments may be used.

Also fabrics, e.g. likewise from reinforced filaments of organic materials may be considered.

According to the embodiment represented in FIG. 2, there is, however, between the cylindrical foam plastic mass 3 and the covering layer a slide layer 10 consisting of a fibre layer in the shape of a parchment paper layer.

Such a parchment paper layer 10 provides a pipe for superior quality in which no cracking occurs even in the case that the tube is subjected to important temperature differences.

Figure 3:
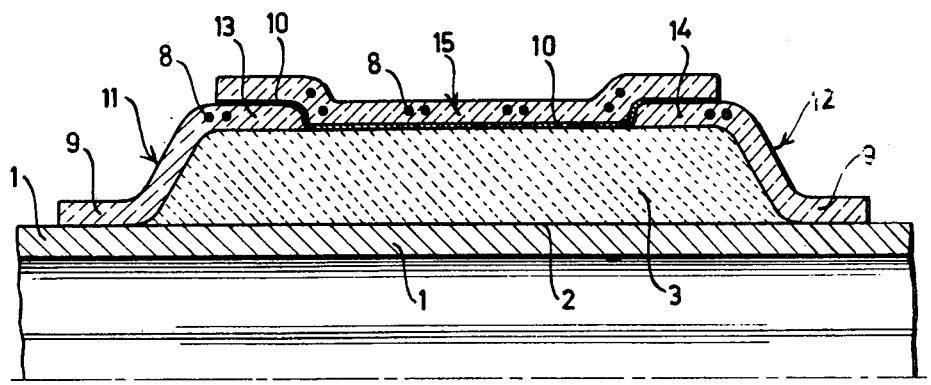
Figure 4:
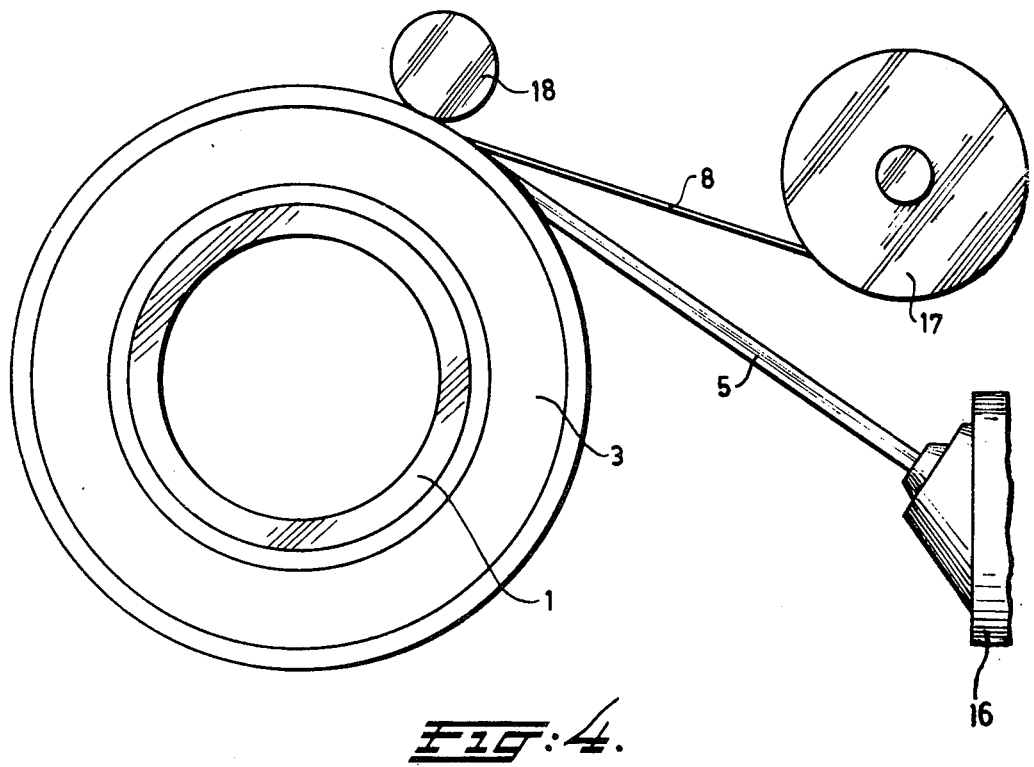
Figure 5:
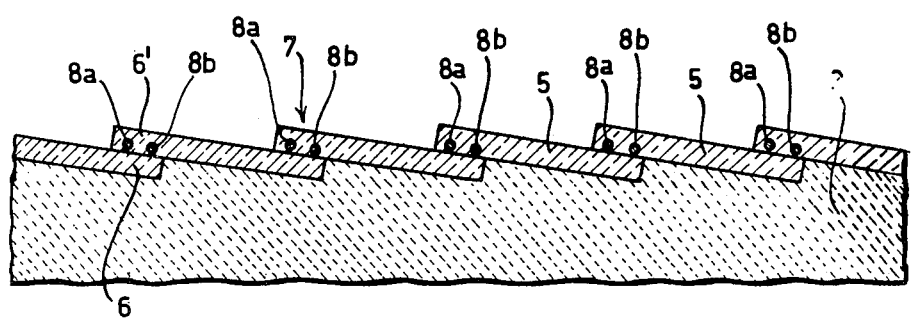

FIG. 3 shows another embodiment consisting of a glass fibre reinforced polyester pipe 1 which on its outside is provided with a foam plastic layer 3.

This pipe is in the way described thereinafter wrapped with polyethylene tape which issued immediately from the extruder and has a temperature ranging from 160° to 180° C. These temperatures may, however, vary as each temperature suffices at which the two contacting surfaces of the thermoplastic tape layer can fuse together.

At first an end covering layer 11, 12 respectively, is wound on the two ends of the foam plastic layer. Starting from a polyethylene tape issuing from an extruder and having a temperature at which the extrusion was effected, this tape is wound around the pipe and around a part of the foam plastic layer 3. Subsequently a parchment paper 10 is applied to the outside of the end portions 13 and 14 of the end covering layers 11 and 12, whereupon the not-covered part of the foam plastic layer is wrapped with polyethylene tape issuing from the extruder, the wrapping being effected from a point situated at some distance from the end 13 to beyond the end of the portion 14 of the parts 11 and 12 of the end covering layer.

The parchment paper layer 10 allows a certain movement of the polyethylene layer, whereby the risk of damage to the polyethylene layer in case of considerable changes in temperature is limited to a minimum.

It is also possible to apply an elastic sealing layer, e.g. consisting of compressible material, like rubber material or other elastomers, a thermoplastic synthetic material, respectively, instead of the parchment paper layer 10, the materials being capable of sealing engagement with the end portions of the central covering layer part 15 which was wound at the second stage.

If desired the paper parchment layer can be caused to continue from the ends 13 and 14 of the end covering layers 11 and 12 for the purpose of covering the foam plastic layer.

It has been found that an excellent covering layer can also be obtained by first forming the end covering layers 11 and 12, cooling said end layers and wrapping the hot tape from a position on end 13 towards a position end 14 such that a sealed connection is obtained between ends 13 and 14 and the central covering layer part 15, e.g. by heatsealing.

For applying the reinforcing glass filaments extending around the entire area of overlap 7, polyethylene tape 5 issuing from the extruder 16 is wound around the foam plastic layer, one or more glass filaments coming from a reel 17 being wound simultaneously around the end, whereupon another tape layer part issuing from the extruder 16 is provided, so that partly due to the effect of the roller 18 a heat sealed joint is formed at the location of the glass filaments 8.

The embodiment of FIG. 6 and 6a is a very preferred embodiment. It shows a part of the polyethylene covering layer 4 with three tape windings, the overlap of each winding being 70 to 80%.

One overlap is broken away to show the reinforcing glass filaments 8a and 8 in the overlap in the plane forming the contact plane between two superposed windings.

The straight glass filaments 8a and the zig-zag or wavy filaments 8c extend around the tube.

Of course it is possible to use only the zig-zag or wavy filaments 8c in each overlap.

The crests 19 of each filaments 8c contact the straight filament 8a, the other crests 20 may not contact a straight filament but of course this is possible, by means of glass filament 8b.

Preferably the distance between a crest 20 and its nearest overlap edge 21' is more or less equal to the distance between straight filament 8a and its nearest overlap edge 22. Other edges are indicated as 21, 21" and 22', 22".

What I claim is:

1. A pipe; the pipe having a length dimension; along at least a part of its length dimension, the pipe being provided on its outside with an outer foam plastic layer;

the foam plastic layer has a length dimension along the pipe that is less than the length dimension of the entire pipe; the foam plastic layer has opposite ends along the length dimension of the pipe;

outside the foam plastic layer, is a wrapped surface layer comprised of windings of thermoplastic tape, the windings are placed so that neighboring windings partially overlap at overlapping parts thereof, the overlapping parts of neighboring windings are heat sealed to each other;

the surface layer has a length dimension along the pipe that is greater than the length dimension of the foam plastic layer along the pipe and the surface layer extends beyond both opposite ends of the foam plastic layer and for a length along the surface of the pipe;

at least one threadlike reinforcing member is embedded in each overlapping part of the thermoplastic tape material and is situated at the surfaces at which the overlapping parts contact and is wound around the pipe.

2. A pipe according to claim 1, wherein the reinforcing member is straight and is wound completely around the pipe.

3. A pipe according to claim 1, wherein the reinforcing member is shaped to be zig-zag and wavy with crests directed along the length of the pipe as the reinforcing member is wound around the pipe.

4. A pipe according to claim 1, wherein the reinforcing member is comprised of a filament formed of glass.

5. A pipe according to claim 1, wherein the reinforcing member is comprised of a filament formed of carbon.

6. A pipe according to claim 1, wherein the surface layer comprises a respective end covering layer part extending over each of the ends of the foam plastic layer and onto and partially along the foam plastic layer and comprises a central covering layer part that includes respective overlapping parts, each of the overlapping parts is wrapped around the outside of a respective one of the two end covering layer parts over the foam plastic layer but each overlapping part is not heat sealed together with the respective end covering layer part; both of the end covering layer parts and the central covering layer part are themselves comprised of windings of the thermoplastic tape including the overlapping parts and the respective reinforcing members embedded.

7. A pipe according to claim 6, further comprising a slide layer provided between the outside of the end covering layer parts and the overlapping parts on the inner side of the central covering layer part cooperating therewith.

8. A pipe according to claim 8, further comprising a sealing layer provided between the outside of the end covering layer parts and the overlapping parts on the inner side of the central covering layer part cooperating therewith.

9. A pipe according to claim 7, wherein the slide layer extends from one of the end covering layer parts as far as the other of the end covering layer parts.

10. A pipe according to claim 9, wherein the slide layer is comprised of a fibre layer.

11. A pipe according to claim 10, wherein the fibre layer is preferably a parchment fibre layer.

12. A pipe according to claim 1, further comprising a slide layer located between the foam plastic layer and the surface layer and extending along the entire outside of the foam plastic layer.

13. A pipe according to claim 12, wherein the slide layer is comprised of a fibre layer.

14. A pipe according to claim 1, wherein there are at least two reinforcing members at each overlapping part.

15. A pipe according to claim 14, wherein the reinforcing members comprise one straight filament that is wound completely around the pipe and a second filament extending wavelike and zig-zag with crests directed along the length of the pipe as the second filament is wound around the pipe.

16. A pipe according to claim 15, wherein the second filament has crests that contact the respective straight filament.

17. A pipe according to claim 16, wherein the distance from the one straight filament to the first most near edge of its respective overlapping part is about equal to the distance between a crest on the side of the second filament away from the one filament and the second most near edge of its respective overlapping part.

18. A pipe according to claim 17, wherein the overlap is at least 50% of the width of the tape.

19. A pipe according to claim 18, wherein the overlap is in the range of 70 to 80% of the width of the tape.

* * * * *